(12) United States Patent
Van Houtum et al.

(10) Patent No.: US 6,714,587 B1
(45) Date of Patent: Mar. 30, 2004

(54) TRANSMISSION SYSTEM WITH IMPROVED SIGNAL CONDITIONING MEANS

(75) Inventors: Wilhelmus J. Van Houtum, Eindhoven (NL); Henry L. Vermeer, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/395,012

(22) Filed: Sep. 13, 1999

(30) Foreign Application Priority Data

Sep. 15, 1998 (EP) ............................................. 98203079

(51) Int. Cl.[7] .............................. H04B 1/38; H04L 27/06
(52) U.S. Cl. ...................................... 375/220; 375/344
(58) Field of Search ................................... 375/219, 220, 375/260, 316, 259, 344, 295, 340

(56) References Cited

U.S. PATENT DOCUMENTS 5,838,739 A * 11/1998 Ramesh et al. .............. 375/348
6,185,251 B1 * 2/2001 Fertner ........................ 375/229
6,353,629 B1 * 3/2002 Pal .............................. 375/222

FOREIGN PATENT DOCUMENTS

| EP | 0180066 | 5/1986 | ........... H04L/11/16 |
| EP | 0629080 A1 | 12/1994 | ........... H04N/5/21 |
| EP | 0663765 A1 | 7/1995 | ........... H04N/5/21 |

OTHER PUBLICATIONS

By E. A. Lee & D.G. Meserschmitt, Adaptive Equalization, Digital Communications Chapter 9, McGraw–Hill, pp. 371–378.

* cited by examiner

Primary Examiner—Tesfaldet Bocure

(57) ABSTRACT

In a transmission system a signal is transmitted by a primary station to a secondary station via a transmission medium. The secondary station comprises a tunable receiver for tuning to a signal received from the transmission medium. The receiver also comprises a signal conditioning unit such as an equalizer with a channel estimation unit for determining at least one property of the transmission channel. The determined property is used for setting the signal conditioning unit at a later instant. This instant can be at the change of frequency where the setting for the signal conditioning unit for the new frequency are calculated from the determined property. The property can be stored for later use when the receiver returns to the previous frequency. The determined property can be used for determining the setting of another signal conditioning unit which comprises a pre-equalizer used with transmitter in the secondary station.

7 Claims, 5 Drawing Sheets

TRANSMISSION SYSTEM WITH IMPROVED SIGNAL CONDITIONING MEANS

The present invention relates to a transmission system comprising a primary terminal comprising a transmitter coupled via a transmission channel to a secondary terminal, the secondary terminal comprises channel estimation means for determining at least one transmission property of the transmission channel, the secondary terminal further comprises signal conditioning means for conditioning a signal in said secondary terminal.

The present invention is also related to a receiver, signal conditioning means and a transmission and receiving method.

A transmission system according to the preamble is known from the book "Digital Communication", by E. A. Lee and D. G. Messerschmitt, chapter 9, "Adaptive Equalization", pp. 371–378.

In transmission systems it can happen that the transmission channel has severe impairments making transmission of information without taking additional measures impossible. In such transmission systems it is often required that the receiver comprises signal-conditioning means, which are arranged for conditioning the signal, received from the transmission medium. Such signal conditioning means can comprise an equalizer for equalizing the transfer function of the transmission medium. Such an equalizer is e.g. required when the signal received by the secondary terminal comprises echoes. These echoes can be caused by multipath transmission in a terrestrial transmission system or by incorrectly terminated coaxial cables in a CATV system.

The signal conditioning means can be realized in the time domain, e.g. by means of a transversal filter, or in the frequency domain, by performing an FFT, processing the FFT coefficients and subsequently performing an inverse FFT.

An object of the present invention is to provide a transmission system according to the preamble being improved in several aspects.

Therefor the present invention is characterized in that the secondary terminal comprising setting means for setting parameters of the signal conditioning means in dependence on a previously determined value of the transmission property.

By setting the parameters of the signal conditioning means in dependence on the previously determined transmission property, it becomes possible to prepare the signal conditioning means for different circumstances such as a different frequency of the signal to be received. It is also possible to set the signal conditioning means used for conditioning a signal to be transmitted by the secondary terminal in dependence on the transmission property determined from the presently received signal.

The present invention is based on the recognition that if some information about the characteristics of the transmission channel is known, it is possible to determine from the transmission property the setting of the signal conditioning means. This information can be exploited to set the (initial) value of the coefficients of the signal conditioning means to more adequate value than is possible without using the information about the characteristics of the transmission channel.

An embodiment of the invention is characterized in that the secondary terminal comprises a receiver with adjustable tuning means for tuning the receiver to the frequency of the signal received from the transmission medium, in that the signal conditioning means are arranged for conditioning the signal received from the transmission medium, in that the tuning means are arranged for switching to the further frequency, and in that the setting means are arranged for setting the parameters of the signal conditioning means for said further frequency at switching to said further frequency.

The advantage of this embodiment is that the signal conditioning means are prepared for switching to a new frequency, resulting in the ability to perform a frequency change rapidly. This is in particular important for digital TV receivers enabling fast "zapping".

An embodiment of the invention is characterized in that the signal conditioning means are arranged as adaptive signal conditioning means, and in that the channel estimation means are arranged for determining the channel property from the parameters of the signal conditioning means after the parameters have converged to a final value.

An easy way of operating the channel estimation means is to take over the coefficients of the adaptive signal conditioning means after it has converged to a final state.

A further embodiment of the invention is characterized in that the setting means are arranged for storing the parameters of the signal conditioning means for a plurality of frequencies to which the receiver is tunable, and in that the setting means are arranged for setting the parameters of the signal conditioning means to the parameters previously stored for said frequency.

By storing the coefficients of the equalizer for later use with the same frequency, an easy way of determining the initial coefficients of the equalizer is obtained. It is observed that in this case, it is advantageous to use an adaptive equalizer operating according to the sign algorithm. An equalizer using the sign algorithm converges quicker than an equalizer using the LMS algorithm when the initial error is below a threshold value. If good starting values are available such as in the present invention, the initial error will in general smaller than said threshold value.

An alternative embodiment of the invention is characterized in that the secondary terminal comprises a transmitter for transmitting a signal on a frequency differing from the frequency of the signal received from the transmission medium and in that the signal conditioning means are arranged for conditioning the signal transmitted by the transmitter.

With this embodiment it becomes possible to determine the setting of signal conditioning means used for processing of a signal to be transmitted. By determining the coefficients for the signal conditioning means from the channel property determined by the channel estimation means, correct parameters for the signal conditioning means are obtained. This embodiment is based on the condition that there is a relation between the channel properties for the frequency for which the channel properties are determined, and the channel properties for the frequency of the signal to be transmitted. This is in particular the case for a CATV system in which the main channel impairments are caused by reflections.

The invention will now be explained with reference to the drawings.

Figure 1:
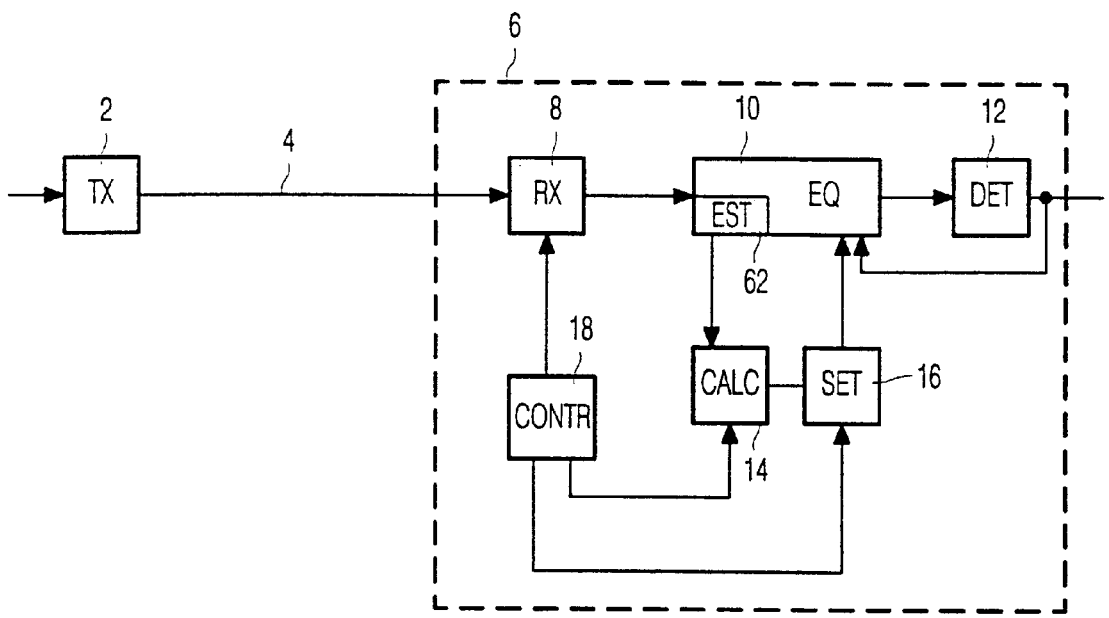
FIG. 1 shows a first embodiment of a transmission system according to the present invention.

In the transmission system according to FIG. 1, the symbols to be transmitted are applied to an input of a transmitter 2 in a primary terminal 3. The output of the transmitter 2 is coupled via a transmission medium 4 to the secondary terminal 6. In the secondary terminal 6, the signal received from the transmission medium 4 is applied to a tunable receiver 8, which receives and demodulates the signal at its input. The output of the receiver 8 is connected to an input of the signal conditioning means, which is here an adaptive equalizer 10. The equalizer 10 is arranged for eliminating the inter-symbol interference, which is caused by the impairments of the transmission medium.

The adaptive equalizer 10 also comprises the channel estimation means 62 for determining a transmission property of the transmission channel. This transmission property is here represented by the coefficients of the equalizer needed to equalize the transmission channel. An output signal present at a first output of the equalizer 10 is passed to an input of a detector 12, which derived detected symbol values from its input signal. The output of the detector 12 is connected to the output of the terminal 6 and to a second input of the equalizer 10.

A second output of the equalizer 10, carrying the coefficients of the adaptive equalizer provided by the channel establishing means 62, is coupled to a first input of a processor 14. The output of the processor 14 is connected to an input of the setting means 16. The output of the setting means 16 is connected to a third input of the equalizer 10 for the coefficients to be set to said equalizer 10. A controller 18 controls the processor 14 and the setting means 16. The controller 18 is arranged for instructing the tuner 8 to change frequency in response to a command of a user. After the change of the frequency, the setting means 16 are instructed to pass the new initial coefficients to be used in the equalizer 10 to a third input of the equalizer.

In an embodiment of the present invention, the coefficients of the equalizer are stored together with an indication of the corresponding frequency in a memory just before the frequency switch is actually performed. This storing is performed for each of the frequencies to which the receiver can be tuned. After a frequency switch has been performed, the coefficients of the equalizer which were stored when the receiver was previously tuned at said frequency, are retrieved from said memory and passed to the equalizer 10 by the setting means 16.

Figure 2:
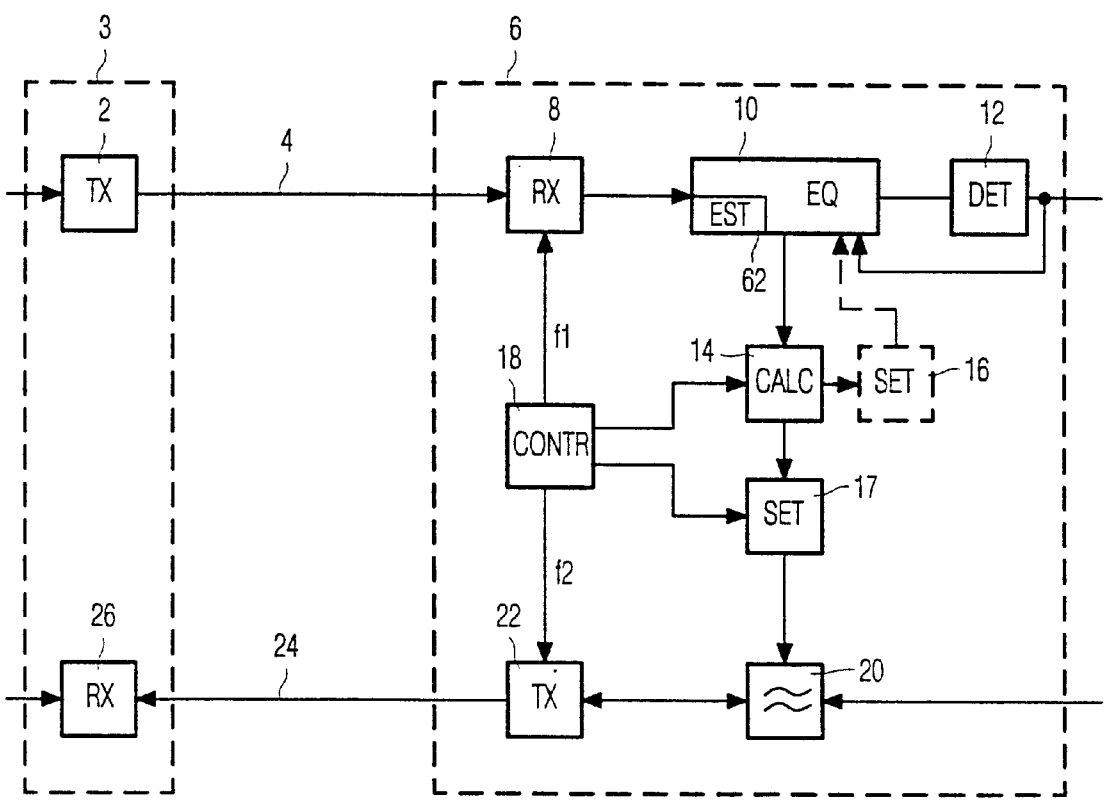
FIG. 2 shows an embodiment of the invention where the secondary terminal comprises a transmitter.

The transmission system according to FIG. 2 comprises besides the elements already present in the transmission system according to FIG. 1, additional elements 17, 20, 22 and 26. The filter 20 is present to provide pre-equalization of the signal to be transmitted by the transmitter 22 in the secondary station to the receiver 26 in the primary station. The setting means 17 are arranged for setting the coefficients of the filter 20 in dependence on the transmission property determined by the channel estimator 62.

Figure 3:
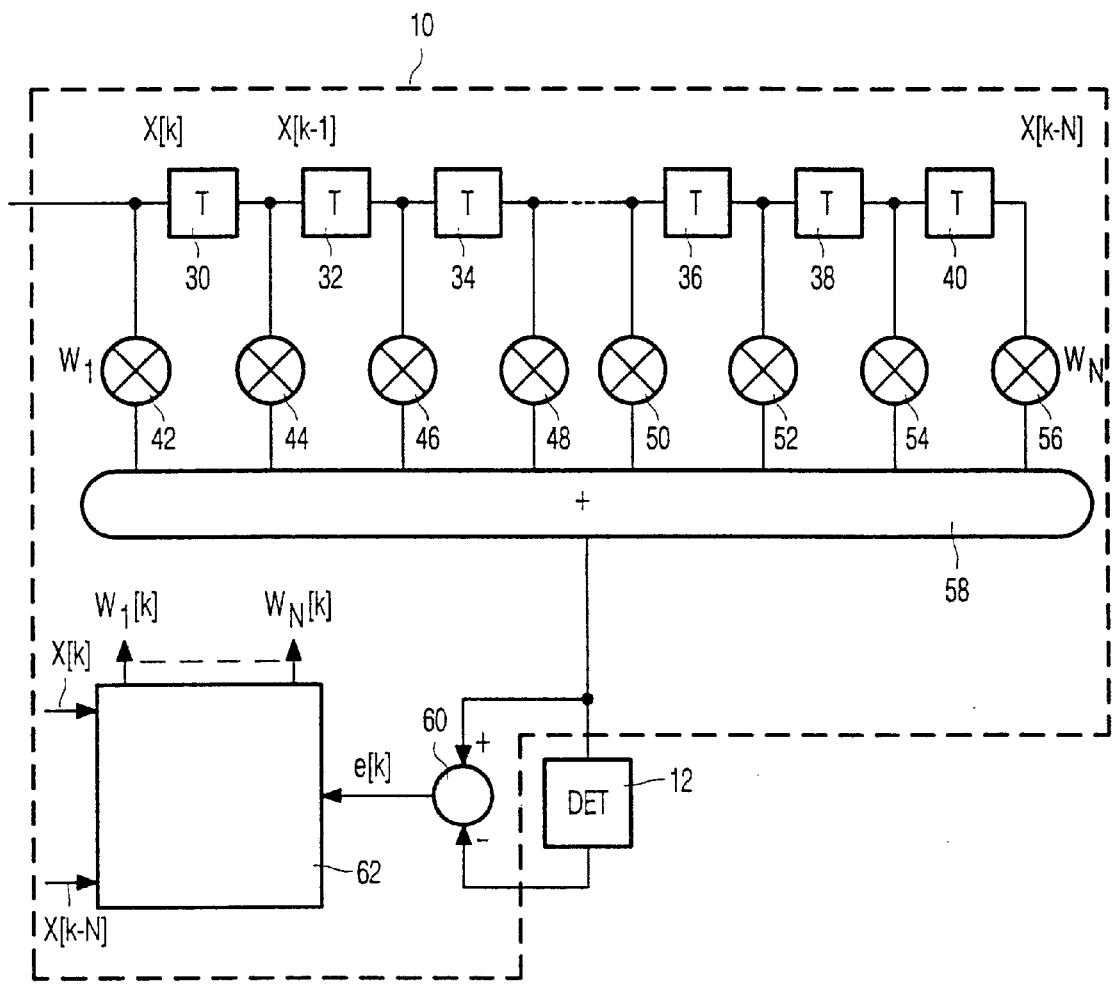
FIG. 3 shows a time domain implementation of the equalizer 10 according to FIG. 1 or 2.

The equalizer 10 according to FIG. 3 is arranged for operating in the time domain. It comprises a common transversal filter having a plurality of interconnected delay elements 30 . . . 40 and a plurality of multipliers 42 . . . 56 with weighting coefficients $w_1$ . . . $w_N$. The signals at the outputs of the multipliers 42 . . . 56 are added by an adder 58. The output signal of the adder 58 is also the output signal of the equalizer 10. The output of the equalizer 10 and the output of the detector 12 are connected to inputs of a subtractor 60 which calculates an error signal e[k] which is used as input signal for the adaptation process to be discussed. The output of the subtractor 60 is connected to an input of the channel estimation means, which are here constituted by adaptation means 62. The signals x[k] . . . x[k−N] are also applied to inputs of the adaptation means 62. The adaptation means 62 are arranged for determining the coefficients $w_1$ . . . $w_N$ to minimize the correlation between the signal e[k] and the signals x[k] . . . x[k−N]. Each of the coefficients $w_j$ is determined according to $$w_j[k]=w_j[k-1]+\alpha \cdot e[k] \cdot x[k-j+1] \tag{1}$$

In (1), α is an adaptation constant controlling the speed of convergence of the equalizer. Because in the present invention the coefficients of the equalizer are set to initial values close to the optimum value, the so-called sign algorithm can be used. A property of the sign algorithm is that it converges quicker than the LMS algorithm according to (1) when the initial error is small. In the sign algorithm the coefficients $w_j$ are determined according to:

$$w_j[k]=w_j[k-1]+\alpha \cdot SGN(e[k]) \cdot x[k-j+1] \tag{2}$$

In (2) SGN indicates the sign function which determines the sign of its argument. The sign function equals to zero if its argument is zero.

Figure 4:
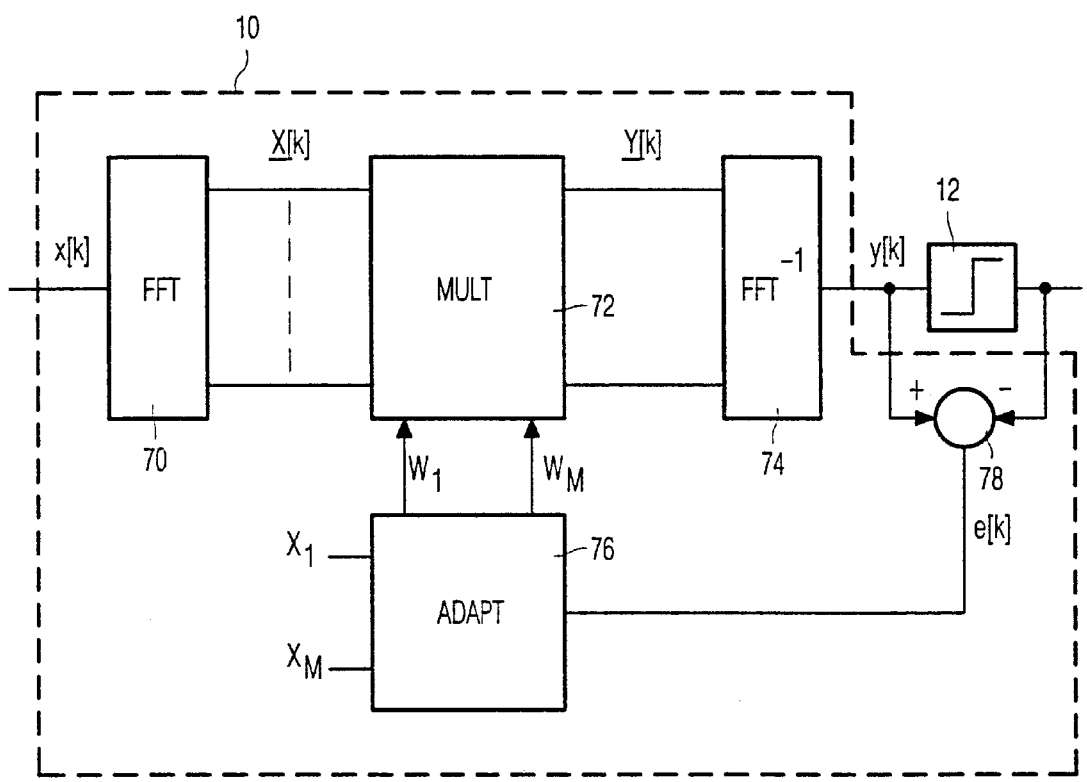
FIG. 4 shows a frequency domain implementation of the equalizer 10 according to FIG. 1 or FIG. 2.

In the equalizer 10 according to FIG. 4, the input signal is applied to an FFT unit 70, which calculates a Fast Fourier Transform from an input vector x[k] representing a block of samples x[k] . . . x[k−M] of the input signal. It is observed that the samples x[k] can be complex, in which the real part of x[k] is the in-phase component of a quadrature signal, and the imaginary part is the quadrature-phase component of the quadrature signal.

The output signal of the FFT unit 70 presents an output vector X[k], which represents the frequency spectrum of the input vector x[k]. The output vector X[k] of the FFT unit 70 is applied to inputs of a multiplier unit 72 which is arranged for multiplying the input vector X[k] with a coefficient vector W[k] representing a block of coefficients $w_1$[k] . . . $w_M$[k].

At the output of the multiplier a vector Y[k], representing a block of coefficients $Y_1$[k] . . . $Y_N$[k−M] is present. An Inverse Fast Fourier Transform unit 74 converts the output vector Y[k] into a vector y[k] which represents a block of output samples y[k] . . . y[k−M]. This block of output samples is converted to a serial stream of output samples, which is applied to the detector 12 and a first input of a subtractor 78. At the output of the detector 12 the detected output symbols are available. The output of the detector 12 is also connected to a second input of a subtractor 78 which determines an error signal e[k] from the input signal and the output signal of the detector 12. The error signal e[k] is applied to an input of channel estimation means which are here an adaptation unit 76. Also the vector X[k] is applied to corresponding inputs of the adaptation means 76. The adaptation means 76 calculate the vector W[k] from the vector X[k] and the error signal e[k] according to:

$$\underline{W}[k+1]=\underline{W}[k]+\alpha \cdot X^*[k] \cdot e[k] \tag{3}$$

In (3) $X^*$[k] is the conjugate of the vector X[k] and α is an adaptation constant. The adaptation speed for all coefficients can be made equal by normalizing the second part of (3) with respect to the power in each spectral bin. In such a case (3) changes into:

$$\underline{W}[k+1]=\underline{W}[k]+\alpha \cdot \underline{P}^{-1}[k] \cdot \underline{X}^*[k] \cdot e[k] \tag{4}$$

In (4) $P^{-1}$ is a matrix which is obtained by inverting a matrix P having an estimate $E\{|X_1[k]|^2\}$ of the power in the frequency bins at its diagonal. P is defined as:

$$P = \begin{bmatrix} E\{|X_1[k]|^2\} & 0 & 0 & 0 & 0 \\ 0 & E\{|X_2[k]|^2\} & 0 & 0 & 0 \\ \vdots & \vdots & \ddots & \vdots & \vdots \\ 0 & 0 & 0 & E\{|X_{M-1}[k]|^2\} & 0 \\ 0 & 0 & 0 & 0 & E\{|X_M[k]|^2\} \end{bmatrix} \tag{5}$$

Figure 5:
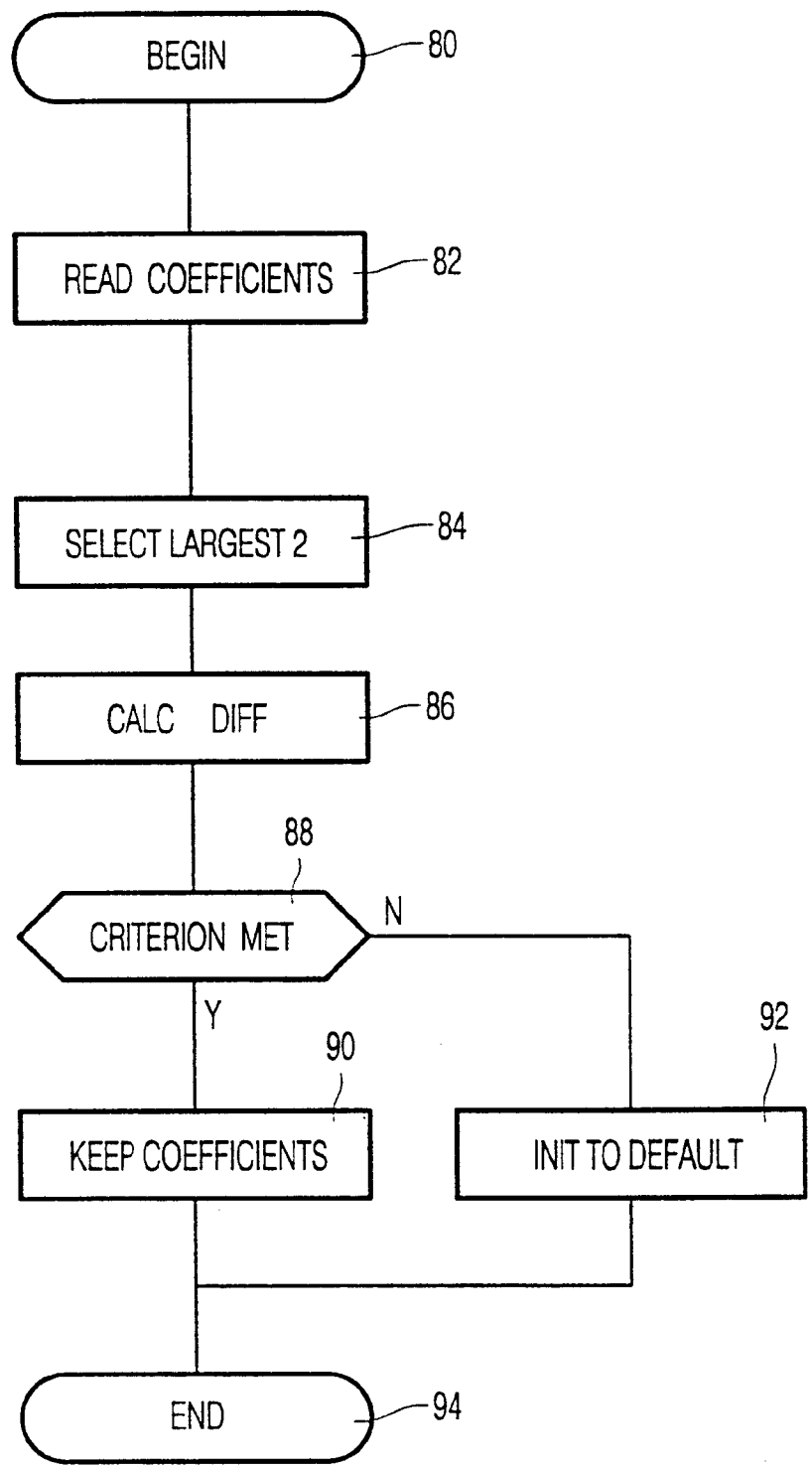
FIG. 5 shows a flowgraph of a program for a programmable processor for implementing the setting means for use with a time domain equalizer.

In the flow diagram according to FIG. 5, the numbered instructions have the following meaning:

| No. | Inscription | Meaning |
| --- | --- | --- |
| 80 | BEGIN | The program is started |
| 82 | READ COEFFICIENTS | The coefficients of the equalizer are read |
| 84 | SELECT LARGEST 2 | The largest two coefficients are selected |
| 86 | CALC DIFFERENCE | The difference between the largest coefficients is calculated |
| 88 | CRITERION MET ? | It is checked whether the coefficients correspond to the channel model. |
| 90 | KEEP COEFFICIENTS | Keep the coefficients of the equalizer at a frequency switch |
| 92 | INIT TO DEFAULT | Initialize the coefficients to a default setting at a frequency switch |
| 94 | END | The program is terminated. |

The program according to the flowgraph of FIG. 5 is called when the controller 18 performs a frequency switch. The program according to FIG. 5 is to be used when the equalizer 10 is implemented according to FIG. 3. In instruction 80 the program is started and the used variables are initialized. In instruction 82 the processor 14 reads the present values of the coefficients $w_1 \ldots w_N$ from the equalizer 10. In instruction 84 the largest two coefficients are selected, and in instruction 86 the difference between the modulus of said coefficients is calculated. In instruction 88, it is checked whether the channel property represented by the coefficients of the equalizer 10 fit in the used channel model. If the difference between the modulus of said two largest coefficients is smaller than a reference value, it is assumed that a substantial reflection is present in the signal. Preferably, it also checked whether the remaining coefficients are substantially smaller than the two largest coefficients. If it is decided that a substantial reflection is present in the signal, the coefficients of the equalizer are not changed at the frequency switch, because the optimal time domain coefficients for compensating a large echo do not depend on the frequency of the signal to be received.

If in instruction 88 it is decided that no substantial reflection is present, in instruction 92 the coefficients of the equalizer 10 are set to a default value. The set of coefficients then comprises one main component, and the remaining coefficients are set to zero.

Figure 6:
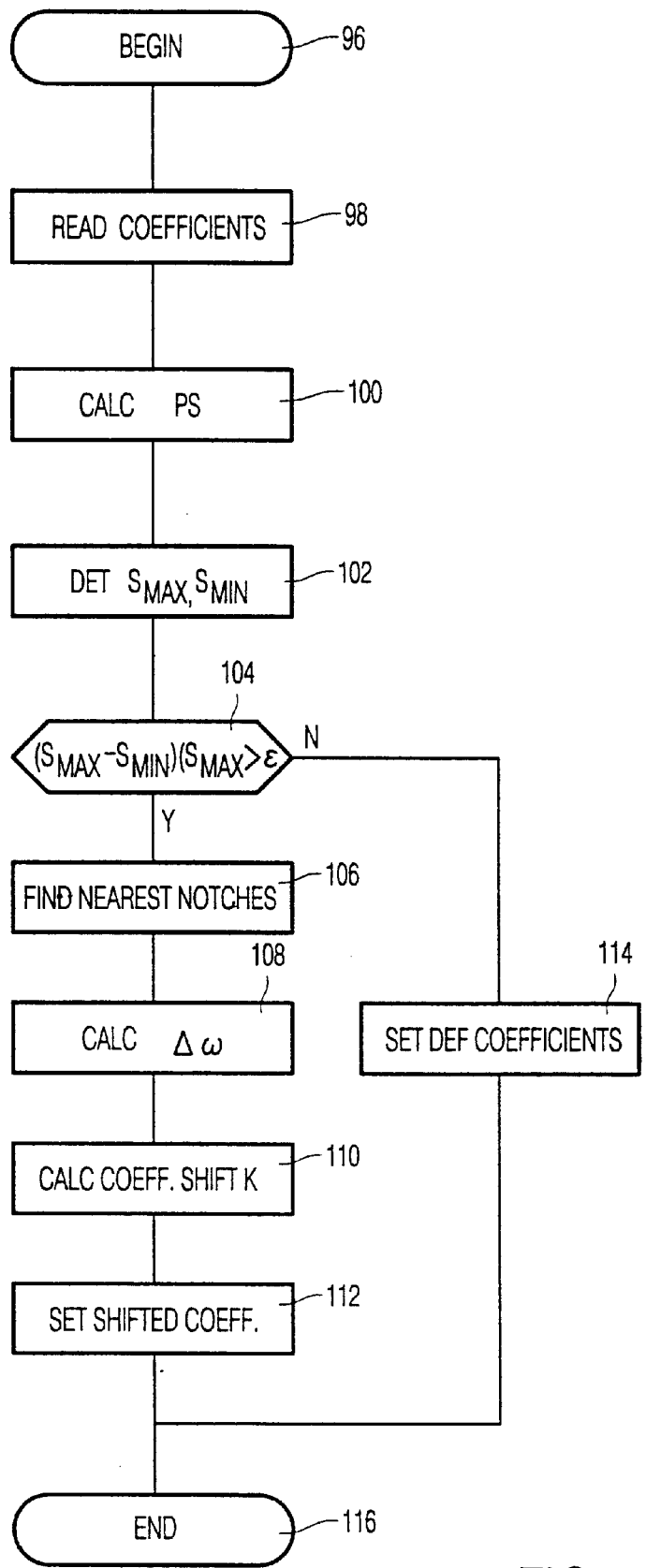
FIG. 6 show a flowgraph of a program for a programmable processor for implementing the setting means for use with a frequency domain equalizer.

In the flow diagram according to FIG. 6, the numbered instructions have the following meaning:

| No. | Inscription | Meaning |
| --- | --- | --- |
| 96 | BEGIN | The program is started |
| 98 | READ COEFFICIENTS | The coefficients of the equalizer are read |
| 100 | CALC PS | The power spectrum is calculated |
| 102 | DET $S_{MAX}$, $S_{MIN}$ | The maximum value and the minimum value of the power spectrum are calculated |
| 104 | $(S_{MAX}-S_{MIN})/S_{MAX} \geq \epsilon$ ? | It is checked whether the transmission channel meets the channel model |
| 106 | FIND NEAREST NOTCHES | The new coefficients for the equalizer are calculated using the channel model |
| 108 | CALC $\Delta\omega$ | The difference between two spectral notches is calculated |
| 110 | CALC COEFF. SHIFT k | The needed coefficient shift value is calculated |
| 112 | SET SHIFTED COEFF. | The shifted coefficients are determined |
| 114 | SET DEFAULT COEFF. | Default coefficients are passed to the filter |
| 116 | END | The program is terminated |

The program according to the flowgraph of FIG. 6 is called when the controller 18 performs a frequency switch. The program according to FIG. 6 is to be used when the equalizer 10 is implemented according to FIG. 4. In instruction 96 the program is started and the used variables are initialized. In instruction 98 the processor 14 reads the present values of the frequency domain coefficients $W_1 \ldots W_M$ from the equalizer 10. In instruction 100 the power spectrum of the input signal is calculated from the filter coefficients. This is done according to:

$$S_i = \frac{1}{|W_i|^2}; \quad 1 \leq i \leq M \tag{6}$$

In instruction 102 the maximum value $S_{MAX}$, the minimum value $S_{MIN}$ of the power spectrum $S_i$ are determined. In instruction 104 it is checked whether the transmission property meets the channel model, by comparing the difference between $S_{MAX}$ and $S_{MIN}$ with a reference value $\epsilon$. If the difference is smaller than $\epsilon$, the channel model is not adequate, and the coefficients of the filter 72 will be set to a default value in instruction 114.

If the difference is larger than $\epsilon$, the transmission channel can adequately be modeled by a multipath transmission model. Consequently, the initial coefficients for the equalizer can be calculated using a multipath transmission model. If the multipath transmission model is described by a direct path having a transfer function equal to 1 and a reflection path having a time delay $\tau$ and an amplitude transfer function $\beta$, the following can be written for the transfer function $H(\omega)$:

$$H(\omega)=1-\beta \cdot e^{-j\omega\tau} \tag{7}$$

If it is assumed that the output signal of the transmitter has a white spectrum, the power spectrum $S(\omega)$ is equal to:

$$S(\omega)=|1-\beta\cdot\cos(\omega\tau)-j\cdot\beta\cdot\sin(\omega\tau)|^2 = 1+\beta^2-2\cdot\beta\cdot\cos(\omega\tau) \tag{8}$$

(8) describes a periodic spectrum having equally spaced peaks with an amplitude $1+\beta$ and notches with an amplitude $1-\beta$. This property of the spectrum will be used for determining the new coefficients of the filter 72. The relation between the parameters $S_{MAX}$ and $S_{MIN}$ and the channel property $\beta$ is given by:

$$S_{MAX}=(1+\beta)^2 \tag{9}$$
$$S_{MIN}=(1-\beta)^2$$

The frequency difference $\Delta\omega$ between two adjacent notches is equal to $2\pi/\tau$. The M spectral values of the FFT transform performed by the FFT unit 70 cover a frequency range equal to the rate $\omega_s$ with which the output signal of the tuner is sampled. Consequently the relation between $\Delta\omega$ and $\Delta i$ is given by:

$$\Delta\omega = \frac{\Delta i}{M} \cdot \omega_s \tag{10}$$

If the tuner is tuned to an angular frequency $\omega_0$, the FFT transform calculated by the FFT unit 70 covers angular frequencies from $\omega_0-\frac{1}{2}\omega_s$ to $\omega_0+\frac{1}{2}\omega_s$. In order to determine the new filter coefficients $W_i$ to be used for a new angular frequency $\omega_1$, in instruction 106 the two notches nearest to $\omega_0$ are determined. This is done by searching two values of $i_{MIN}$. This search is started from $i=M/2$ which corresponds to an angular frequency of $\omega_0$. The search is arranged to find the first value $i_{MIN1}$ smaller than $M/2$ and the first value $i_{MIN2}$ larger than $M/2$. From the values $i_{MIN1}$ and $i_{MIN2}$ the value of $\Delta\omega$ can be calculated according to (10) using $\Delta i = i_{MIN2} - i_{MIN1}$.

After the tuner has been tuned to an angular frequency $\omega_1$ the distance between the tuning frequency and the nearest notch has changed. This change Δθ can be calculated according to:

$$\Delta\theta = \left(\frac{\omega_0 - \omega_1}{\Delta\omega}\right) - \text{ROUND}\left(\frac{\omega_0 - \omega_1}{\Delta\omega}\right) \quad (11)$$

In (11) the function ROUND represents the integer value nearest to its argument. If the argument is exactly between two integers, it can be rounded to the largest integer. The value Δθ represents a shift of the frequency spectrum of the input signal of the equalizer. Because the only change in the spectrum of the input signal of the equalizer is a frequency shift, the optimum values of the adaptive filter can also be obtained by a simple frequency shift. In a frequency domain filter, the coefficients have to be shifted over a frequency corresponding to Δθ. The shift Δθ can be realized by replacing the coefficients $W_i$ by coefficients $W_{i+k}$. The value of this shift k is calculated in instruction 110 according to k=M·Δθ/$\omega_s$. In instruction 112, the coefficients $W_i$ are replaced by the coefficients $W_{i+k}$. If i+k becomes negative, the coefficients $W_i$ are replaced by $W_{i+k+\Delta i}$. If i+k becomes larger than M, the coefficients $W_i$ are replaced by $W_{i+k-\Delta i}$.

After the new coefficients $W_i$ have been set, the program is terminated.

What is claimed is:

1. A transmission system comprising a primary terminal comprising a transmitter coupled via a transmission channel to a secondary terminal, the secondary terminal comprises channel estimation means for determining at least one transmission property of the transmission channel, a receiver with adjustable tuning means for tuning the receiver to a frequency of the signal received from the transmission channel, the secondary terminal further comprises signal conditioning means for conditioning a signal in said secondary terminal in dependence on said transmission property, characterized in that the secondary terminal comprising, setting means for setting parameters of the signal conditioning means in dependence on a previously determined value of the transmission property within the range of frequencies to which the receiver is tunable, and a transmitter for transmitting a signal on a frequency differing from the frequency of the signal received from the transmission medium and in that the signal conditioning means are arranged for conditioning the signal transmitted by the transmitter, wherein the signal conditioning means are arranged for conditioning the signal received from the transmission medium, in that the tuning means are arranged for switching to the frequency, and in that the setting means are arranged for setting the parameters of the signal conditioning means for said frequency at switching to said frequency and wherein the setting means are arranged for setting the parameters of the signal conditioning means to be parameters previously stored for said frequency.

2. Transmission system according to claim 1, characterized in that the signal means are arranged as adaptive signal conditioning means, and in that the setting means are arranged for storing the parameters of the signal conditioning means after the parameters have converged to a final value.

3. Transmission system comprising a primary terminal comprising a transmitter coupled via a transmission channel to a secondary terminal, the secondary terminal comprises a receiver with adjustable tuning means for tuning the receiver to a frequency of the signal received from the transmission channel, channel estimation means for determining at least one transmission property of the transmission channel, the secondary terminal further comprises signal conditioning means for conditioning a signal in said secondary terminal in dependence on said transmission property, characterized in that the secondary terminal comprising setting means for setting parameters of the signal conditioning means in dependence on a previously determined value of the transmission property within the range of frequencies to which the receiver is tunable, and the setting means are arranged for calculating the parameters of the signal conditioning means in dependence on previously determined parameters of the signal conditioning means by using a model of the transmission medium, wherein the model comprises a multi-path transmission model and the multi-path transmission model comprises one direct path and one indirect path.

4. Transmission system comprising a primary terminal comprising a transmitter coupled via a transmission channel to a secondary terminal, the secondary terminal comprises channel estimation means for determining at least one transmission property of the transmission channel, the secondary terminal further comprises signal conditioning means for conditioning a signal in said secondary terminal in dependence on said transmission property, a receiver with adjustable tuning means for tuning the receiver to the frequency of the signal received from the transmission medium, characterized in that the signal conditioning means are arranged for conditioning the signal received from the transmission medium, in that the tuning means are arranged for switching to the frequency, and in that the setting means are arranged for storing the parameters of the signal conditioning means for a plurality of frequencies to which the receiver is tunable, and in that the setting means are arranged for setting the parameters of the signal conditioning means to the parameters previously stored for said frequency.

5. Transmission system according to claim 4, characterized in that the signal conditioning means are arranged as adaptive signal conditioning means, and in that the setting means are arranged for storing the parameters of the signal conditioning means after the parameters have converged to a final value.

6. Transmission system according to claim 4, characterized in that the transmission system comprises a multi-path transmission system.

7. Transmission system according to claim 6, characterized in that the multi-path transmission system comprises one direct path and one indirect path.

* * * * *